(12) United States Patent
David et al.

(10) Patent No.: US 8,383,712 B2
(45) Date of Patent: Feb. 26, 2013

(54) PLASTIC COMPRISING ZINC SULPHIDE

(75) Inventors: Stéphane David, Düsseldorf (DE);
Petra Fritzen, Duisburg (DE); Ludger Heiming, Wesel (DE); Thomas Rentschler, Bensheim (DE)

(73) Assignee: Sachtleben Chemie GmbH, Duisburg (DE)

( * ) Notice: Subject to any disclaimer, the term of this patent is extended or adjusted under 35 U.S.C. 154(b) by 60 days.

(21) Appl. No.: 12/303,976

(22) PCT Filed: Jun. 21, 2007

(86) PCT No.: PCT/EP2007/056192
§ 371 (c)(1),
(2), (4) Date: May 19, 2009

(87) PCT Pub. No.: WO2007/147871
PCT Pub. Date: Dec. 27, 2007

(65) Prior Publication Data
US 2010/0160514 A1      Jun. 24, 2010

(30) Foreign Application Priority Data
Jun. 21, 2006   (DE) .................... 10 2006 028 896

(51) Int. Cl.
*C08K 3/30* (2006.01)
*C08K 5/09* (2006.01)

(52) U.S. Cl. ...................................... 524/420; 524/301
(58) Field of Classification Search ................... 524/420
See application file for complete search history.

(56) References Cited

U.S. PATENT DOCUMENTS

| | | | | |
|---|---|---|---|---|
| 3,856,729 | A * | 12/1974 | Shimozato et al. | 524/254 |
| 4,545,926 | A * | 10/1985 | Fouts et al. | 252/511 |
| 5,124,391 | A * | 6/1992 | Muehlbach et al. | 524/420 |
| 5,131,952 | A * | 7/1992 | Hayashi et al. | 106/420 |
| 2003/0139501 | A1 * | 7/2003 | Lewin | 524/100 |
| 2004/0079547 | A1 * | 4/2004 | Rodway et al. | 174/110 PM |
| 2005/0042453 | A1 * | 2/2005 | James et al. | 428/403 |
| 2007/0155883 | A1 * | 7/2007 | Sato et al. | 524/420 |
| 2009/0025978 | A1 * | 1/2009 | Sato | 174/72 A |

FOREIGN PATENT DOCUMENTS

| | | | |
|---|---|---|---|
| JP | 07 157650 A | | 6/1995 |
| JP | 07157650 A | * | 6/1995 |
| JP | 2004 059690 A | | 2/2004 |
| JP | 2004059690 A | * | 2/2004 |

OTHER PUBLICATIONS

Translation of JP 2004059690, Feb. 2004.*
Translation of JP 07157650, Jun. 1995.*
Chalk, et al. "Catalysis of Cyclohexene Autoxidation by Trace Metals in Non-Polar Media", Research Assoc. Brit, Rubber Manufact., (1957), pp. 1214-1234.

* cited by examiner

*Primary Examiner* — Hui Chin
(74) *Attorney, Agent, or Firm* — Fulbright & Jaworski LLP

(57) ABSTRACT

The present invention relates to a plastic comprising zinc sulphide and to its use.

20 Claims, 2 Drawing Sheets

PLASTIC COMPRISING ZINC SULPHIDE

This application is a §371 of PCT/EP2007/056192 filed Jun. 21, 2007, which claims priority from DE 10 2006 028 896.3 filed Jun. 21, 2006.

The present invention provides a plastic containing zinc sulfide, and its use.

The invention further relates to improvement of the heat stability of plastics, especially thermoplastics and elastomeric plastics, by using zinc sulfide, particularly in combination with organic antioxidants and organic metal deactivators.

Plastics, especially thermoplastics and elastomeric plastics, are increasingly being used in applications with high demands on service life. The following applications may be mentioned as examples: cable insulations, hot-water pipes, e.g. for underfloor heating, washing machine and dishwasher hoses, and pump housings. The principal plastics used in these applications are those based on polymers such as polyethylene (PE) and polypropylene (PP). Examples of applications for elastomeric plastics, e.g. those based on polymers such as styrene-butadiene rubber (SBR), are gaskets and vibration absorbers. During processing and in the final application the plastics are exposed to various stresses which have a decisive influence on the service life of the plastic. Mechanical stress, temperature and UV light lead to polymer damage and consequent impairment of the visual and mechanical properties; in other words, yellowing and embrittlement occur, for example.

Of great importance in the degradation of the polymer is the autoxidation (autoxidation cycle) illustrated schematically in FIG. 1. The action of heat, UV light or shear stresses during processing leads to cleavage of the polymer chains and the formation of radicals R.. Peroxy radicals ROO. form in the presence of atmospheric oxygen and these react with the polymer RH to give the hydroperoxide ROOH. The reaction products formed on decomposition of the hydroperoxide are the radicals RO. and .OH, which contribute to further degradation of the polymer.

The homolytic decomposition of the hydroperoxide ROOH into the radicals RO. and .OH is rate-determining for the autoxidation because a high activation energy is required and the reaction only takes place at temperatures of 150° C. and above. The presence of catalytic amounts of heavy metal ions lowers the activation energy and now enables the decomposition of the hydroperoxide to take place at room temperature. Catalytically active metals are those for which two oxidation states differing by one valency unit have comparable stabilities. These include e.g. $Cu^{1+}/Cu^{2+}$, $Fe^{2+}/Fe^{3+}$, $Co^{2+}/Co^{3+}$ or $Mn^{2+}/Mn^{3+}$. The redox process can be described as follows (A. J. Chalk and J. F. Smith, Trans. Farad. Soc. 53 (1957), p. 1214):

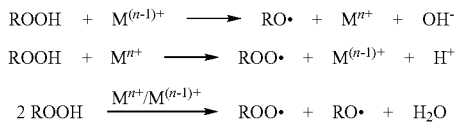

M = Fe, Cu, Mn, Co, Ce, V

The heavy metal ions are therefore of great importance for the stability of the polymer. Heavy metal ions are incorporated e.g. via mineral fillers such as talcum, calcium carbonate, kaolin or barium sulfate. These fillers are intended to improve e.g. the mechanical properties of the plastics, such as impact strength, rigidity, dimensional stability and sound insulation. Direct contact between the plastic and a heavy metal, especially copper, occurs e.g. in applications such as hot-water pipes, specifically in e.g. underfloor heating, and cable insulations.

To increase the long-term heat stability and ageing resistance of plastics, especially thermoplastics and elastomeric plastics, specifically polyolefin-based plastics, metal deactivators (MD) are used in addition to basic stabilization by means of organic antioxidants (AO).

The following classes of compounds are typically used as antioxidants: Sterically hindered phenols, secondary aromatic amines, aminophenols, thioethers, phosphites and phosphonites, sterically hindered amines, epoxy compounds.

The metal deactivators typically used are organic chelating compounds that are capable of immobilizing heavy metal ions in the form of metal complexes.

The following classes of compounds, for example, are used:

Carboxamides, cyclic amides, hydrazones and bishydrazones, hydrazides, diacylated hydrazines, heterocyclic compounds such as melamine, benzotriazoles, 8-oxyquinoline, hydrazones and acylated derivatives of hydrazinotriazines, polyhydrazides, sterically hindered phenols, Ni salts of benzylphosphonic acid, Sn compounds of pyridinethiol, tertiary phosphorous acid esters of sulfur-containing bisphenols, and/or thioethers.

One problem is that organic metal deactivators can migrate out of the polymer matrix to be protected, thereby losing activity. Furthermore, the activity of the organic metal deactivator can also be reduced by adsorption on the surface of fillers, so even plastics which have been provided with long-term heat stability and ageing resistance according to the prior art are subject to premature impairment of their visual and mechanical properties.

However, a more substantial increase in long-term heat stability and ageing resistance is desirable for certain applications of plastics, e.g. underfloor heating pipes. At any rate these plastic pipes should remain undamaged for years or decades under a floor when subjected to alternate thermal and mechanical stresses.

The object of the present invention is therefore to overcome the disadvantages of the prior art. In particular, the object of the present invention is to provide plastics which have a markedly increased long-term heat stability and/or ageing resistance compared with the prior art.

According to the invention, the object is surprisingly achieved by the characteristics of the main Claim. Preferred embodiments can be found in the subordinate Claims.

The object is achieved according to the invention by a plastic containing zinc sulfide which has a mean particle size $d_{50}$ of 1 to 400 nm, preferably of 1 to 250 nm, particularly preferably of 1 to 50 nm, especially of 3 to 20 nm and very particularly preferably of 5 to 15 nm.

It has been found, surprisingly, that plastics which contain zinc sulfide in combination with organic antioxidants and metal deactivators have a markedly increased long-term heat stability and ageing resistance compared with plastics stabilized according to the prior art.

In particular, the present invention provides a plastic containing zinc sulfide which has increased long-term heat stability and/or ageing resistance, and its use.

Figure 1:
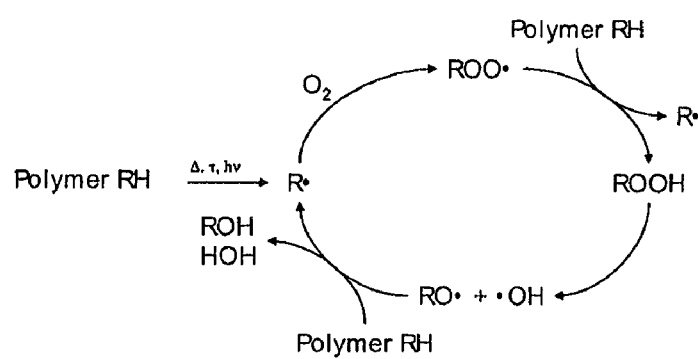
FIG. 1 schematically illustrates polymer degradation due to autoxidation.

A plastic which contains zinc sulfide with a mean particle size $d_{50}$ of 300 to 350 nm (Sachtolith HD-S) in combination with organic antioxidants and metal deactivators already exhibits a 50% increase in long-term heat stability and ageing resistance compared with plastics stabilized according to the prior art. A plastic which contains zinc sulfide with a mean particle size $d_{50}$ of 1 to 250 nm (ZnS (nano)) in combination with organic antioxidants and metal deactivators exhibits more than a 100% increase in long-term heat stability and ageing resistance compared with plastics stabilized according to the prior art.

According to the invention, such a plastic contains e.g. 12 to 99.8 wt. % of thermoplastic, 0 to 80 wt. % of mineral filler, 0.05 to 1.0 wt. % of antioxidant, 0.05 to 2.0 wt. % of organic metal deactivator and 0.1 to 5.0 wt. % of ZnS (nano).

Furthermore, the rate of loss of elasticity of an elastomeric plastic, based e.g. on a styrene-butadiene rubber (SBR), at high temperature could be reduced by adding zinc sulfide with a mean particle size $d_{50}$ of 1 to 250 nm (ZnS (nano)).

In one embodiment according to the invention, such an elastomeric plastic contains e.g. 100 phr of elastomer, 0 to 10 phr of vulcanization accelerator, 0 to 10 phr of vulcanization retarder, 0 to 20 phr of zinc oxide, 0 to 10 phr of stearic acid, 0 to 20 phr of sulfur and/or peroxide, 0 to 300 phr of mineral filler, 0 to 200 phr of plasticizer, 0 to 30 phr of a protective system containing e.g. antioxidants and antiozonants, and 0.1 to 10 phr, preferably 0.5 to 7 phr and particularly preferably 2 to 5 phr of ZnS (nano). As is known to those skilled in the art and conventional for elastomers, the proportions of the components are given in phr (parts per hundred of resin).

It is assumed that the sulfide anions of the zinc sulfide form, with the heavy metal ions, sparingly soluble heavy metal sulfides that do not migrate in the plastic. This greatly restricts the availability of the heavy metal ions as a catalyst for the autoxidation of the polymer.

The plastics according to the invention are produced by processes according to the prior art.

The invention specifically provides:
a plastic containing zinc sulphide, wherein:
the zinc sulfide:
has a mean particle size $d_{50}$ of 1 to 400 nm, preferably of 1 to 250 nm, particularly preferably of 1 to 50 nm, especially of 3 to 20 nm and very particularly preferably of 5 to 15 nm;
has a specific surface area (BET) of 20 to 300 m$^2$/g, preferably of 50 to 180 m$^2$/g
possesses an inorganic and/or organic surface modification wherein:
the inorganic surface modification of the zinc sulfide consists of a compound containing at least two of the following elements: aluminium, antimony, barium, calcium, cerium, chlorine, cobalt, iron, phosphorus, carbon, manganese, oxygen, sulfur, silicon, nitrogen, strontium, vanadium, zinc, tin, zirconium;
the organic surface modification is selected from at least one of the following classes of substances: polyethers, siloxanes, polysiloxanes, polycarboxylic acids, polyesters, polyamides, polyethylene glycols, poly-alcohols, fatty acids, preferably unsaturated fatty acids, polyacrylates;
is present in the finished plastic in a proportion of 0.1 to 5 wt. %, preferably of 0.2 to 2 wt. % and particularly preferably of 0.5 to 1.5 wt. %;
the plastic is a thermoplastic which:
is preferably selected from: polyethylene (PE), polypropylene (PP), polybutylene (PB), polyamide (PA), polyvinyl chloride (PVC), acrylonitrile-butadiene-styrene terpolymer (ABS), polymethyl methacrylate (PMMA), polycarbonate (PC), polyoxymethylene (POM), polybutylene terephthalate (PBT), polyurethane (PUR) or mixtures of at least two of these plastics;
contains 12 to 99.8 wt. % of thermoplastic, 0 to 80 wt. % of mineral filler, 0 to 80 wt. % of flameproofing agent, 0.05 to 1.0 wt. % of antioxidant, 0.05 to 2.0 wt. % of organic metal deactivator and 0.1 to 5 wt. %, preferably 0.2 to 2 wt. % and particularly preferably 0.5 to 1.5 wt. % of ZnS (nano);
the plastic is an elastomeric plastic which:
is preferably selected from: natural rubber (NR), isoprene rubber (IR), butyl rubber (CIIR, BIIR), butadiene rubber (BR), styrene-butadiene rubber (SBR), acrylonitrile-butadiene rubber (NBR), bromobutyl rubber (BIIR), styrene-butadiene-isoprene rubber (SBIR), chloroprene rubber (CR), chlorosulfonated polyethylene rubber (CSM), hydrogenated NBR (HNBR), polymethylsiloxane-vinyl rubber (VMQ), acrylate-ethylene rubber (AEM), acrylate rubber (ACM), fluorinated rubber (FKM), fluorosilicone rubber (FVMQ), thermoplastic elastomers (TPE), thermoplastic elastomers (TPE) based on polyamide (TPA), based on copolyesters (TPC), based on olefins (TPO), based on styrene (TPS), based on polyurethane (TPU) or based on crosslinked rubber (TPV), or mixtures of at least two of these plastics;
contains 100 phr of elastomer, 0 to 10 phr of vulcanization accelerator, 0 to 10 phr of vulcanization retarder, 0 to 20 phr of zinc oxide, 0 to 10 phr of stearic acid, 0 to 20 phr of sulfur and/or peroxide, 0 to 300 phr of mineral filler, 0 to 200 phr of plasticizer, 0 to 30 phr of a protective system preferably containing antioxidants and antiozonants, and 0.1 to 10 phr, preferably 0.5 to 7 phr and particularly preferably 2 to 5 phr of ZnS (nano);
the use of the plastic according to the invention:
in thermally stressed systems;
in systems where it is in direct contact with metal and/or water;
for the manufacture of cable insulations, pump housings, gaskets and vibration absorbers, hot-water pipes, e.g. for underfloor heating, and washing machine and dishwasher hoses;
a masterbatch containing zinc sulfide for the manufacture of a plastic according to the invention, wherein:
the zinc sulfide:
has a mean particle size $d_{50}$ of 1 to 400 nm, preferably of 1 to 250 nm, particularly preferably of 1 to 50 nm, especially of 3 to 20 nm and very particularly preferably of 5 to 15 nm;
has a specific surface area (BET) of 20 to 300 m$^2$/g, preferably of 50 to 180 m$^2$/g;
possesses an inorganic and/or organic surface modification wherein:
the inorganic surface modification of the zinc sulfide consists of a compound containing at least two of the following elements: aluminium, antimony, barium, calcium, cerium, chlorine, cobalt, iron, phosphorus, carbon, manganese, oxygen, sulfur, silicon, nitrogen, strontium, vanadium, zinc, tin, zirconium;

the organic surface modification is selected from at least one of the following classes of substances: polyethers, siloxanes, polysiloxanes, polycarboxylic acids, polyesters, polyamides, polyethylene glycols, poly-alcohols, fatty acids, preferably unsaturated fatty acids, polyacrylates; is present in the masterbatch in a proportion of 0.5 to 25 wt. %, preferably of 1 to 10 wt. % and particularly preferably of 2 to 5 wt. %;

the use of the masterbatch according to the invention for the manufacture of the plastic according to the invention;

the use of zinc sulfide for increasing the long-term heat stability and/or ageing resistance of plastics;

the use of zinc sulfide for increasing the long-term heat stability and/or ageing resistance of plastics containing mineral fillers.

The Examples which follow will illustrate the invention in greater detail without thereby implying a limitation.

The starting components Sachtolith HD-S ($d_{50}$ 300 to 350 nm) or zinc sulfide (ZnS (nano)) and optionally talcum were used to prepare PP masterbatches according to the invention, e.g.: talcum 25 wt. % in PP-H (homopolymer), Sachtolith HD-S 50 wt. % in PP-H, ZnS (nano) ($d_{50}$=10 nm) 5 wt. % in PP-H. Masterbatches formulated according to the prior art were also prepared. The addition of dispersants, antioxidants and metal deactivators was omitted in the preparation of the masterbatches.

Nine different PP compositions corresponding to the formulations listed in the Table, based on the previously prepared masterbatches, were then produced with a Brabender single-screw extruder. Antioxidant and metal deactivator in powder form were added, according to the formulation, only when the test material was produced.

The plastics are produced by processes according to the prior art.

TABLE 1

Formulations of PP compounds

| Formulation | | Talcum [wt. %] | AO[1] [wt. %] | MD[2] | Sachtolith HD-S | ZnS (nano) |
|---|---|---|---|---|---|---|
| 1 | PP without additives | — | — | — | — | — |
| 2 | PP/talc | 20 | — | — | — | — |
| 3 | PP/talc/ZnS | 20 | — | — | 4.5 | — |
| 4 | PP/talc/AO/ZnS | 20 | 0.15 | — | 4.5 | — |
| 5 | PP/talc/AO/MD | 20 | 0.15 | 0.3 | — | — |
| 6 | PP/talc/AO/MD/ZnS | 20 | 0.15 | 0.3 | 4.5 | — |
| 7 | PP/AO/MD | — | 0.15 | 0.2 | — | — |
| 8 | PP/AO/MD/ZnS | — | 0.15 | 0.2 | — | 4.5 |
| 9 | PP/AO/MD/ZnS (nano) | — | 0.15 | 0.2 | — | 1 |

[1]AO = pentaerythritol tetrakis(3-(3,5-ditert-butyl-4-hydroxyphenyl)propionate)
[2]MD = 2',3-bis[[3-[3,5-ditert-butyl-4-hydroxyphenyl]propionyl]]propionohydrazide
The polypropylene makes up the remainder to 100 wt. %.

The plastics obtained were subsequently converted to test pieces (125 mm×10 mm×0.5 mm) on an injection-moulding machine, e.g. an Arburg Allrounder, and these were then subjected to the tests described below.

EXAMPLE 1

Heat Stability Test TAT (Thermal Ageing Test) at 140° C.

The heat stability test TAT was carried out at 140° C. in a circulating air drying oven analogously to DIN 53383. The test pieces were suspended in the oven by means of a clamp. As soon as a test piece showed signs of polymer degradation in the form of brown specks, it was withdrawn from the test programme. The time was noted. The results are reproduced in Table 2.

TABLE 2

Results of the heat stability test TAT at 140° C.

| Formulation | | Residence time in oven [h] |
|---|---|---|
| 1 | PP without additives | 1100 |
| 2 | PP/talc | 150 |
| 3 | PP/talc/ZnS | 150 |
| 4 | PP/talc/AO/ZnS | 1050 |
| 5 | PP/talc/AO/MD | 1400 |
| 6 | PP/talc/AO/MD/ZnS | 1900 |

EXAMPLE 2

Combined Water-Bath Storage for 1500 h at 85° C. and Oven ageing TAT at 140° C.

The test pieces were stored vertically in stainless steel test-tube racks in an electrically heated bath containing demineralized water at 85° C. The water was changed once a week. After 1500 h in the water bath the test pieces were stored in the circulating air drying oven and tested as described in Example 1. The results are reproduced in Table 3.

TABLE 3

Results of the combined water-bath storage for 1500 h at 85° C. and oven ageing TAT at 140° C.

| Formulation | | Residence time in oven [h] |
|---|---|---|
| 5 | PP/talc/AO/MD | 400 |
| 6 | PP/talc/AO/MD/ZnS | 600 |

EXAMPLE 3

Heat Stability Test TAT at 140° C. with Copper Contact

To simulate a cable application the test pieces were wrapped in Cu foil and stored in the circulating air drying oven and tested as described in Example 1. The results are reproduced in Table 4.

TABLE 4

Results of the heat stability test TAT at 140° C. with copper contact

| Test | | Residence time in oven [h] |
|---|---|---|
| 7 | PP/AO/MD | 2550 |
| 8 | PP/AO/MD/ZnS | 2850 |
| 9 | PP/AO/MD/ZnS (nano) | 5180 |

Other thermoplastics preferred according to the invention have the following compositions:

75.25 wt. % of PP, 20 wt. % of talcum, 0.15 wt. % of antioxidants (polynuclear phenols and alkyl disulfide), 0.1 wt. % of metal deactivator (tris[2-tert-butyl-4-thio-(2'-methyl-4'-hydroxy-5'-tert-butyl)phenyl-5-methyl]phenyl phosphite) and 4:5 wt. % of Sachtolith HD-S.

78.75 wt. % of PP, 20 wt. % of talcum, 0.15 wt. % of antioxidants (polynuclear phenols and alkyl disulfide), 0.1 wt. % of metal deactivator (tris[2-tert-butyl-4-thio-(2'-methyl-4'-hydroxy-5'-tert-butyl)phenyl-5-methyl]phenyl phosphite) and 1 wt. % of ZnS (nano).

EXAMPLE 4

Oven Ageing of a Styrene-Butadiene Rubber at 150° C.

Five different elastomer compositions were prepared according to the formulations listed in Table 5. The individual components were successively mixed on a two-roll calender in a temperature range of 20 to 80° C. The test pieces required to determine the Shore-A hardness analogously to DIN 53505 were stamped out of the rolled sheet in a thickness of 6 mm.

TABLE 5

Formulations of SBR mixtures

| Component | Mixture 1 | Mixture 2 | Mixture 3 | Mixture 4 | Mixture 5 |
|---|---|---|---|---|---|
| SBR (VSV5025-0HM) | | | 100 phr | | |
| Zinc oxide active | | | 2.5 phr | | |
| Edenor C18 (stearic acid) | | | 1 phr | | |
| Vulkacit CZ/CV (N-cyclohexyl-2-benzo-thiazylsulfenamide) | | | 1.8 phr | | |
| Vulkacit D/C (diphenylguanidine) | | | 2 phr | | |
| Ground sulfur | | | 1.5 phr | | |
| Vulkanox HS/LG (2,2,4-trimethyl-1,2-dihydroquinoline) | 0 phr | 1 phr | 1 phr | 1 phr | 1 phr |
| Vulkanox 4020/LG (N-(1,3-dimethylbutyl)-N'-phenyl-p-phenylene-diamine) | 0 phr | 1 phr | 1 phr | 1 phr | 1 phr |
| ZnS (nano) | 0 phr | 0 phr | 2 phr | 5 phr | 10 phr |

EXAMPLE 5

Heat Stability Test TAT at 150° C. with Copper Contact

The heat stability test TAT was carried out at 150° C. in a circulating air drying oven analogously to DIN 53383. The test pieces were wrapped in Cu foil and suspended in the oven by means of a clamp. They were taken out of the oven after 3, 4, 5, 6, 7 and 10 days, the Cu foil was removed and the Shore-A hardness was determined at the point of contact with Cu analogously to DIN 53505, a higher Shore-A hardness being a measure of the undesirable embrittlement of the material. The results are reproduced in Table 6 and FIG. 2.

TABLE 6

Shore-A hardness after thermal ageing at 150° C.

| | Start | 3 d | 4 d | 5 d | 6 d | 7 d | 10 d |
|---|---|---|---|---|---|---|---|
| Mixture 1 | 61 | 81 | 82 | 84 | 87 | 88 | 90 |
| Mixture 2 | 61 | 70 | 81 | 85 | 87 | 88 | 89 |
| Mixture 3 | 62 | 68 | 72 | 72 | 79 | 85 | 88 |
| Mixture 4 | 63 | 66 | 70 | 71 | 74 | 80 | 89 |
| Mixture 5 | 62 | 69 | 72 | 74 | 78 | 83 | 88 |

Figure 2:
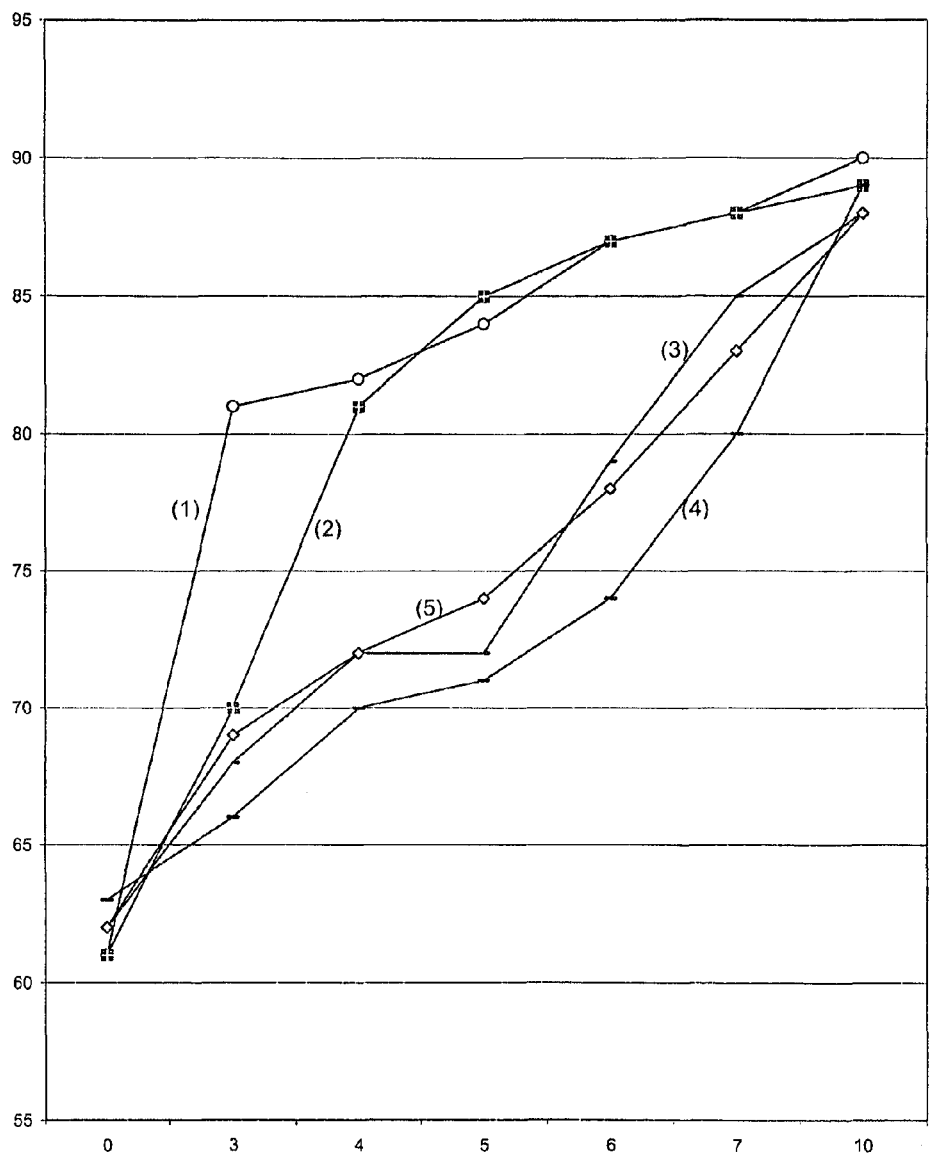
FIG. 2 graphically illustrates results of a heat stability test TAT at 150° C.

| FIG. 2: | Abscissa: | Time in days; |
|---|---|---|
| | Ordinate: | Shore-A hardness; |
| | (1): | Mixture 1; |
| | (2): | Mixture 2; |
| | (3): | Mixture 3; |
| | (4): | Mixture 4; |
| | (5): | Mixture 5 |

The invention claimed is:

1. A composition comprising plastic and from 0.1 to 5 wt. % of zinc sulfide, wherein the zinc sulfide has a specific surface area as measured by BET of 50-180 m²/g, and has a mean particle size $d_{50}$ of 1-250 nm.

2. The composition of claim 1, wherein the zinc sulfide possesses an inorganic and/or organic surface modification.

3. The composition of claim 1, wherein the inorganic surface modification of the zinc sulfide comprises at least two members selected from the group consisting of aluminum, antimony, barium, calcium, cerium, chlorine, cobalt, iron, phosphorus, carbon, manganese, oxygen, sulfur, silicon, nitrogen, strontium, vanadium, zinc, tin and zirconium.

4. The composition of claim 1, wherein the organic surface modification comprises at least one member selected from the group consisting of a polyether, a siloxane, a polysiloxane, a polycarboxylic acid, a polyester, a polyamide, a polyethylene glycol, a polyalcohol and a fatty acid.

5. The composition of claim 1, wherein the plastic is thermoplastic.

6. The composition of claim 1, wherein the plastic comprises at least one member selected from the group consisting of polyethylene, polypropylene, polybutylene, polyamide, polyvinyl chloride, acrylonitrile-butadiene-styrene terpolymer, polymethyl methacrylate, polycarbonate, polyoxymethylene, polybutylene terephthalate and polyurethane.

7. The composition of claim 1, containing from 12 to 99.8 wt. % plastic, from 0 to 80 wt. % of mineral filler, from 0 to 80 wt. % of a flameproofing agent, from 0.05 to 1.0 wt. % of antioxidant, and from 0.05 to 2.0 wt. % of organic metal deactivator.

8. The composition of claim 1, wherein the plastic is elastomeric.

9. The composition of claim 1, further comprising at least one elastomer selected from the group consisting of natural rubber, isoprene rubber, butyl rubber, butadiene rubber, styrene-butadiene rubber, acrylonitrile-butadiene rubber, bromobutyl rubber, styrene-butadiene-isoprene rubber, chloroprene rubber, chlorosulfonated polyethylene rubber, hydrogenated NBR, polymethylsiloxane-vinyl rubber, acrylate-ethylene rubber, acrylate rubber, fluorinated rubber, fluorosilicone rubber, a thermoplastic elastomer, a thermoplastic elastomer based on polyamide, a thermoplastic elastomer based on a copolyester, a thermoplastic elastomer based on olefins, a thermoplastic elastomer based on styrene, a thermoplastic elastomer based on polyurethane and a thermoplastic elastomer based on crosslinked rubber.

10. The composition of claim 1, wherein it contains 100 phr of elastomer, 0 to 10 phr of vulcanization accelerator, 0 to 10 phr of vulcanization retarder, 0 to 20 phr of zinc oxide, 0 to 10 phi of stearic acid, 0 to 20 phr of at least one of sulfur or peroxide, 0 to 300 phr of mineral filler, 0 to 200 phr of plasticizer, and 0 to 30 phr of a protective system.

11. A thermally stressed system comprising the composition of claim 1.

12. The composition of claim 1 in direct contact with at least one of metal or water.

13. A cable insulation, a pump housing, a gasket, a vibration absorber, a hot-water pipe, a washing machine hose or a dishwasher hose comprising the composition of claim 1.

14. A masterbatch for the manufacture of a plastic containing from 0.1 to 5 wt. % of zinc sulfide, wherein the zinc sulfide has a specific surface area as measured by BET of 50-180 $m^2/g$, and has a mean particle size $d_{50}$ of 1-250 nm.

15. The masterbatch according to claim 14, wherein the zinc sulfide possesses at least one of an inorganic or organic surface modification.

16. The masterbatch according to claim 15, wherein the inorganic surface modification of the zinc sulfide comprises at least two compounds selected from the group consisting of aluminium, antimony, barium, calcium, cerium, chlorine, cobalt, iron, phosphorus, carbon, manganese, oxygen, sulfur, silicon, nitrogen, strontium, vanadium, zinc, tin and zirconium.

17. The masterbatch of claim 15, wherein the organic surface modification is at least one member selected from the group consisting of a polyether, a siloxane, a polysiloxane, a polycarboxylic acid, a polyester, a polyamide, a polyethylene glycol, a polyalcohol, a fatty acid and a polyacrylate.

18. The masterbatch of claim 14, wherein the zinc sulfide is present in the masterbatch in a range of from 0.5 to 25 wt. %.

19. A method comprising providing a masterbatch for the manufacture of a plastic containing zinc sulfide to manufacture the plastic according to claim 1.

20. The composition of claim 4, wherein the organic surface modification is at least one of unsaturated fatty acids or polyacrylates.

* * * * *